United States Patent
Harris et al.

(10) Patent No.: US 8,810,587 B2
(45) Date of Patent: Aug. 19, 2014

(54) CONVERSION OF CONTIGUOUS INTERLEAVED IMAGE DATA FOR CPU READBACK

(75) Inventors: Jerry Glen Harris, Newberry, FL (US); Yuyan Song, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 204 days.

(21) Appl. No.: 13/563,521

(22) Filed: Jul. 31, 2012

(65) Prior Publication Data
US 2013/0229422 A1   Sep. 5, 2013

Related U.S. Application Data

(60) Provisional application No. 61/606,216, filed on Mar. 2, 2012.

(51) Int. Cl.
*G06T 15/00*   (2011.01)

(52) U.S. Cl.
USPC .......................................... 345/522; 345/426

(58) Field of Classification Search
CPC .............. G06T 1/60; G06T 1/00; G06T 15/80
USPC ........................... 345/522, 426, 547; 382/162
See application file for complete search history.

(56) References Cited

U.S. PATENT DOCUMENTS

| 5,671,440 A * | 9/1997 | Curry ............................ 345/656 |
| 5,798,753 A * | 8/1998 | Zhou et al. .................... 345/603 |
| 7,155,577 B1 | 12/2006 | Kiselev et al. |
| 7,751,646 B2 | 7/2010 | Inazumi |
| 8,068,545 B2 | 11/2011 | Penna et al. |
| 2008/0158238 A1 * | 7/2008 | Kim et al. ..................... 345/559 |

OTHER PUBLICATIONS

U.S. Appl. No. 13/563,528, filed Jul. 31 2012, Jerry Glen Harris et al.

* cited by examiner

*Primary Examiner* — Maurice L McDowell, Jr.
(74) *Attorney, Agent, or Firm* — Wolfe-SBMC

(57) ABSTRACT

A method, system, and computer-readable storage medium are disclosed for conversion of contiguous interleaved image data. Image data in a contiguous interleaved format is received at a graphics processing unit (GPU). The GPU generates converted image data in a tiled format based on the image data in the contiguous interleaved format. The GPU sends the converted image data in the tiled format to a central processing unit (CPU).

20 Claims, 19 Drawing Sheets

| R | R | R | R | G | G | G | G | B | B | B | B | A | A | A | A |
|---|---|---|---|---|---|---|---|---|---|---|---|---|---|---|---|
| R | R | R | R | G | G | G | G | B | B | B | B | A | A | A | A |
| R | R | R | R | G | G | G | G | B | B | B | B | A | A | A | A |
| R | R | R | R | G | G | G | G | B | B | B | B | A | A | A | A |

← Planar Tiles 400

Figure 4A

| R | G | B | A | R | G | B | A | R | G | B | A | R | G | B | A |
|---|---|---|---|---|---|---|---|---|---|---|---|---|---|---|---|
| R | G | B | A | R | G | B | A | R | G | B | A | R | G | B | A |
| R | G | B | A | R | G | B | A | R | G | B | A | R | G | B | A |
| R | G | B | A | R | G | B | A | R | G | B | A | R | G | B | A |

← Interleaved Tiles 410

Figure 4B

```
for (y =0; y< rows; y++)
{
    for (x = 0; x< cols; x++)
    {
        unsigned int srcChunkyPixel = *src++;
        *dstRed++ = extractRed(srcChunkyPixel);
        *dstGreen++ = extractGreen(srcChunkyPixel);
        *dstBlue++ = extractBlue(srcChunkyPixel);
        *dstApha++ = extractAlpha(srcChunkyPixel);
    }
src += srcAdvance;
dstRed += dstAdvance;
dstGreen += dstAdvance;
dstBlue += dstAdvance;
dstApha += dstAdvance;
}
```

Figure 9

©2012 Adobe Systems Inc.

```
	// TexRectInfo
	//(X,Y): rect dimension in pixels (width, height)
	//(Z,W) origin in ChunkyRect texture
	//uniform vec4 SubTileInfo;
	//(X,Y): sub-tile dimension in pixels
	//(Z,W) sub-tile dst origin within the topmost and leftmost tile
in pixels
	// other input gl_TexCoord[0].st: texture coordinate uniform sampler2DRect ChunkyRECT;
	uniform vec4 TexRectInfo;
	uniform vec4 SubTileAlphaInfo;
	uniform vec4 SubTileRedInfo;
	uniform vec4 SubTileGreenInfo;
	uniform vec4 SubTileBlueInfo;
	uniform float DstRectWidth;
```

Figure 10A

©2012 Adobe Systems Inc.

```
    vec2 calcSrcPosInVStrip(vec4 tile_geometry, int src_y_pos, int
pixel_index, int strip_width, int strip_height)
    {
        int tile_height = int(tile_geometry.y);
        if (tile_height > strip_height)
            tile_height = strip_height;
        int tile_width = int(tile_geometry.x);
        int cur_tile_width = tile_width - int(tile_geometry.z);
        if (cur_tile_width > strip_width)
            cur_tile_width = strip_width;
        int pixels_per_cur_tile = tile_height * cur_tile_width;
        vec2 result = vec2(0,src_y_pos);
        if (pixel_index < pixels_per_cur_tile)
        {
            int y = pixel_index/cur_tile_width;
            result.y += float(y);
            result.x = float(pixel_index - (y* cur_tile_width));
            return result;
        }
        result.x += float(cur_tile_width);
        pixel_index -= pixels_per_cur_tile;
        if (cur_tile_width + tile_width > strip_width)
            cur_tile_width = strip_width - cur_tile_width;
        else cur_tile_width = tile_width;
        pixels_per_cur_tile = strip_height * cur_tile_width;
        int tile =(pixel_index /pixels_per_cur_tile);
        result.x += float(cur_tile_width * tile);
        pixel_index -= (pixels_per_cur_tile * tile);
        if ((int(result.x) + cur_tile_width > strip_width))
            cur_tile_width = strip_width - int(result.x);
        int y = pixel_index/cur_tile_width;
        result.y += float(y);
        result.x += float(pixel_index - (y* cur_tile_width));
        return result;
    }
```

Figure 10B

©2012 Adobe Systems Inc.

```
    vec2  CalcSrcPos(vec4  tile_geometry,   int   buffer_width,   int
buffer_height, int pixel_index)
    {
        int tile_height = int(tile_geometry.y);
        int first_tile_height = tile_height - int(tile_geometry.w);
        if (first_tile_height > buffer_height)
            first_tile_height = buffer_height;
        int pixels_in_firstStrip = first_tile_height* buffer_width;
        if (pixel_index < pixels_in_firstStrip)
        {
            return    calcSrcPosInVStrip    (tile_geometry,   0,
pixel_index, buffer_width, first_tile_height);
        }
        int y = first_tile_height;
        pixel_index -= pixels_in_firstStrip;
        int pixels_per_fullStrip = tile_height* buffer_width;
        int strip = (pixel_index /pixels_per_fullStrip);
        pixel_index -= (strip*pixels_per_fullStrip);
        y += (strip * tile_height);
        if (y + tile_height > buffer_height)
            tile_height = buffer_height - y;
        return  calcSrcPosInVStrip  (tile_geometry,  y,  pixel_index,
buffer_width, tile_height);
    }
```

Figure 10C

©2012 Adobe Systems Inc.

```
    void main(void)
    {
        int src_buffer_width = int(TexRectInfo.x);
        int src_buffer_height = int(TexRectInfo.y);
        int     channel_pixel_count    =    src_buffer_width    *
src_buffer_height;
        int yPos = int(gl_FragCoord.y);
        int     output_stream_index       =       4*((yPos      *
int(DstRectWidth))+(int(gl_FragCoord.x)));
        int total_pixels_to_process = 4 * channel_pixel_count;

if (output_stream_index < total_pixels_to_process)
        {
            float finalCol[4];
            for (int i=0; i<4; i++)
            {
                int   channel   =   output_stream_index    /
channel_pixel_count;
                int   pixel_index   =   output_stream_index    -
(channel * channel_pixel_count);
                {
                    vec4 subTileInfo;
                    if (channel == 0)
                        subTileInfo = SubTileRedInfo;
                    else if (channel == 1)
                        subTileInfo = SubTileGreenInfo;
                    else if (channel == 2)
                        subTileInfo = SubTileBlueInfo;
                    else
                        subTileInfo = SubTileAlphaInfo;
                    vec2   TexLookup   =   TexRectInfo.zw   +
CalcSrcPos(subTileInfo,    src_buffer_width,    src_buffer_height,
pixel_index);
                    vec4 srcPixel = texture2DRect(ChunkyRECT,
TexLookup);
```

Figure 10D

```
    if (channel == 0)
                {
                        finalCol[i] = srcPixel.r;
                }
                else if (channel == 1)
                {
                        finalCol[i] = srcPixel.g;
                }
                else if (channel == 2)
                {
                        finalCol[i] = srcPixel.b;
                }
                else
                {
                        finalCol[i] = srcPixel.a;
                }
            }
            output_stream_index++;
        }
    gl_FragColor.b = finalCol[0];
    gl_FragColor.g = finalCol[1];
    gl_FragColor.r = finalCol[2];
    gl_FragColor.a = finalCol[3];
    }
    else discard;
}
```

Figure 10E

©2012 Adobe Systems Inc.

```
// TexRectInfo
//(X,Y): rect dimension in pixels (width, height)
//(Z,W) origin in ChunkyRect texture
//uniform vec4 SubTileInfo;
//(X,Y): sub-tile dimension in pixels
//(Z,W) sub-tile dst origin within the topmost and leftmost tile
in pixels
// DstRectInfo
//(X,Y): rect dimension in pixels (width, height)
// other input gl_TexCoord[0].st: texture coordinate uniform sampler2DRect ChunkyRECT;
uniform vec4 TexRectInfo;
uniform vec4 SubTileInfo;
uniform float DstRectWidth;

vec2  determineSrcPosInVStrip(vec4  tile_geometry,  vec2  src_pos,
int pixel_index, int buffer_width, int strip_height)
    {
        int tile_height = int(tile_geometry.y);
        if (tile_height > strip_height)
            tile_height = strip_height;
        int tile_width = int(tile_geometry.x);
        int cur_tile_width = tile_width - int(tile_geometry.z);
        int pixels_per_cur_tile = strip_height * cur_tile_width;
        vec2 result = src_pos;
        if (pixel_index < pixels_per_cur_tile)
        {
            int y = pixel_index/cur_tile_width;
            result.y += float(y);
            result.x = float(pixel_index - (y* cur_tile_width));
            return result;
        }
        result.x += float(cur_tile_width);
        pixel_index -= pixels_per_cur_tile;
        if (tile_width + cur_tile_width > buffer_width)
            cur_tile_width = buffer_width - cur_tile_width;
        else cur_tile_width = tile_width;
```

Figure 11A

©2012 Adobe Systems Inc.

```
            pixels_per_cur_tile = strip_height * cur_tile_width;
            int tile =(pixel_index /pixels_per_cur_tile);
            result.x += float(cur_tile_width * tile);
            pixel_index -= (pixels_per_cur_tile * tile);
            if  ((tile  >   0)  &&   (int(result.x)  +  cur_tile_width  >
buffer_width))
                cur_tile_width = buffer_width - int(result.x);
            int y = pixel_index/cur_tile_width;
            result.y += float(y);
            result.x += float(pixel_index - (y* cur_tile_width));
            return result;
        } vec2   FindSrcPos(vec4   tile_geometry,   int   buffer_width,   int
buffer_height, int pixel_index)
        {
            int tile_height = int(tile_geometry.y);
            int first_tile_height = tile_height - int(tile_geometry.w);
            if (first_tile_height > buffer_height)
                first_tile_height = buffer_height;
            int pixels_in_firstStrip = first_tile_height* buffer_width;
            if (pixel_index < pixels_in_firstStrip)
            {
                return    determineSrcPosInVStrip    (tile_geometry,
vec2(0, 0), pixel_index, buffer_width, first_tile_height);
            }
            int y = first_tile_height;
            pixel_index -= pixels_in_firstStrip;
            int pixels_per_fullStrip = tile_height* buffer_width;
            int strip = (pixel_index /pixels_per_fullStrip);
            pixel_index -= (strip*pixels_per_fullStrip);
            y += (strip * tile_height);
            if (y + tile_height > buffer_height)
                tile_height = buffer_height - tile_height;
            return determineSrcPosInVStrip (tile_geometry, vec2(0, y),
pixel_index, buffer_width, tile_height);
        }
```

Figure 11B

©2012 Adobe Systems Inc.

```
void main(void)
{
    int buffer_width = int(TexRectInfo.x);
    int buffer_height = int(TexRectInfo.y);
    int     pixel_index    =    int((gl_FragCoord.t    *
DstRectWidth)+gl_FragCoord.s);
    int total_pixels_to_process = buffer_width*buffer_height;
    if (pixel_index < total_pixels_to_process)
    {
        vec2    TexLookup    =    TexRectInfo.zw    +
FindSrcPos(SubTileInfo, buffer_width, buffer_height, pixel_index);
        gl_FragColor = texture2DRect(ChunkyRECT, TexLookup);
    }
    else discard;
}
```

Figure 11C

©2012 Adobe Systems Inc.

CONVERSION OF CONTIGUOUS INTERLEAVED IMAGE DATA FOR CPU READBACK

PRIORITY INFORMATION AND COPYRIGHT NOTICE

This application claims benefit of priority of U.S. Provisional Application Ser. No. 61/606,216 entitled "Conversion of Contiguous Interleaved Image Data for CPU Readback" filed Mar. 2, 2012, the content of which is incorporated by reference herein in its entirety.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

1. Field of the Invention

The present invention is directed to computer systems; and more particularly, it is directed to digital image processing.

2. Description of the Related Art

As the complexity of digital imaging increases, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programming interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. Programs used for manipulating and transforming digital images may be referred to as image processing programs or image editing programs. It is desirable for image editing programs to access and store digital image data in an efficient manner.

SUMMARY

Various embodiments of systems, methods, and computer-readable storage media for conversion of contiguous interleaved image data are disclosed. Image data in a contiguous interleaved format may be received at a graphics processing unit (GPU). The GPU may generate converted image data in a tiled format based on the image data in the contiguous interleaved format. The tiled format may be readable by an image editing program running on a central processing unit (CPU).

To convert the image data, the GPU may execute a shader program such as a pixel shader. The output of the shader may comprise a plurality of tiles representing a rearrangement of the RGBA image data from the original image data in the contiguous interleaved format. In one embodiment, the tiled format comprises a tiled planar format. In one embodiment, the tiled format comprises a tiled interleaved format.

The converted image data in the tiled format may be sent from the GPU to the CPU. In one embodiment, a readback operation may be used to transfer the converted image data from the GPU to the CPU. The converted image data may be stored in a memory managed by the CPU. An image editing program on the CPU may read the converted image data in the tiled format.

BRIEF DESCRIPTION OF THE DRAWINGS

FIG. 4A illustrates an example of planar tiled storage of RGBA data, according to one embodiment.

FIG. 4B illustrates an example of interleaved tiled storage of RGBA data, according to one embodiment.

FIG. 9 illustrates an example of program code for de-interleaving image data from the returned buffer into the planar tiles, according to one embodiment.

FIGS. 10A through 10E illustrate example program code for converting contiguous interleaved image data to a tiled planar format, according to one embodiment.

FIGS. 11A through 11C illustrate example program code for converting contiguous interleaved image data to a tiled interleaved format, according to one embodiment.

Figure 1:
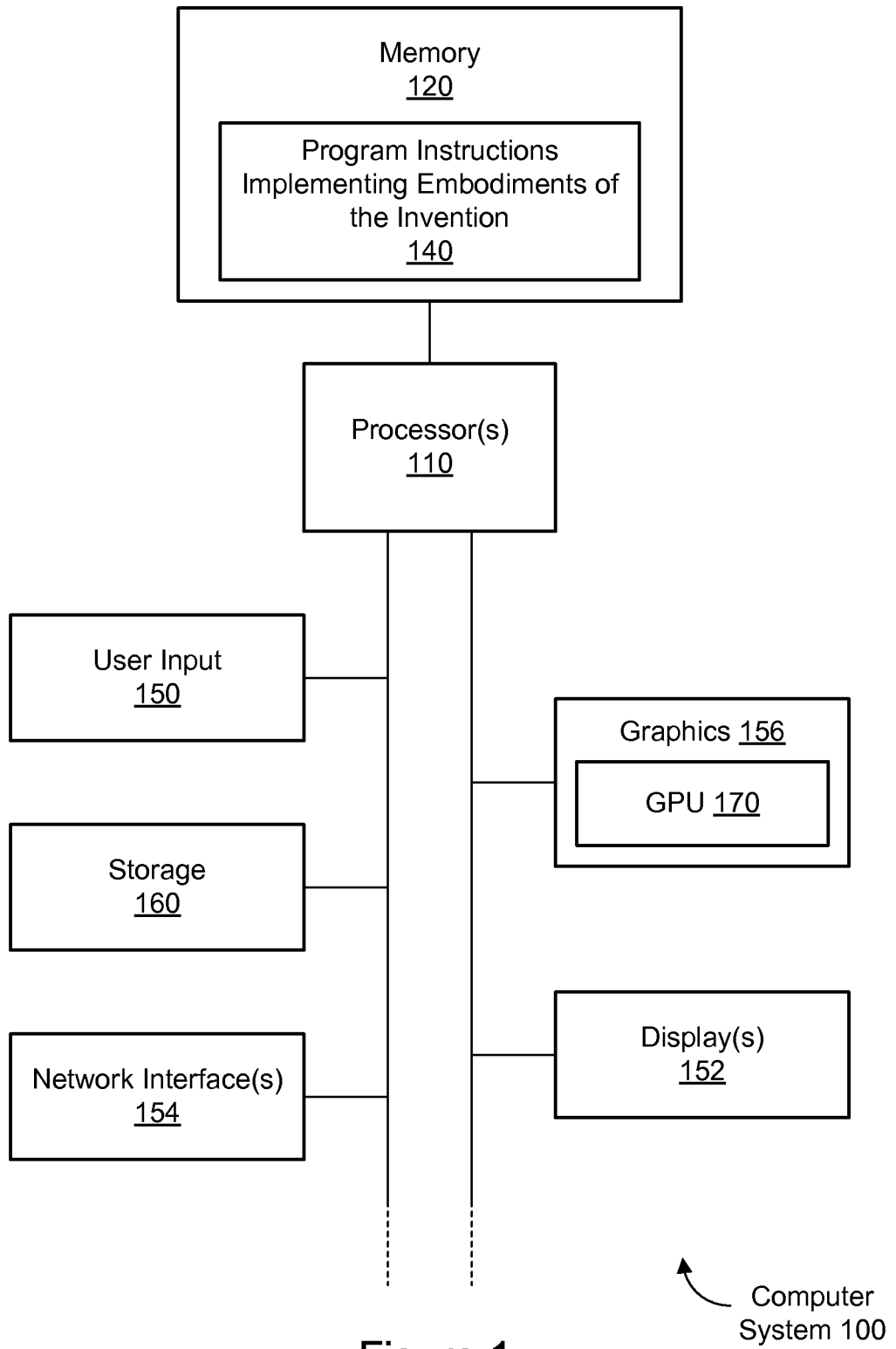
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to perform a conversion of image data from a contiguous interleaved format using a GPU. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
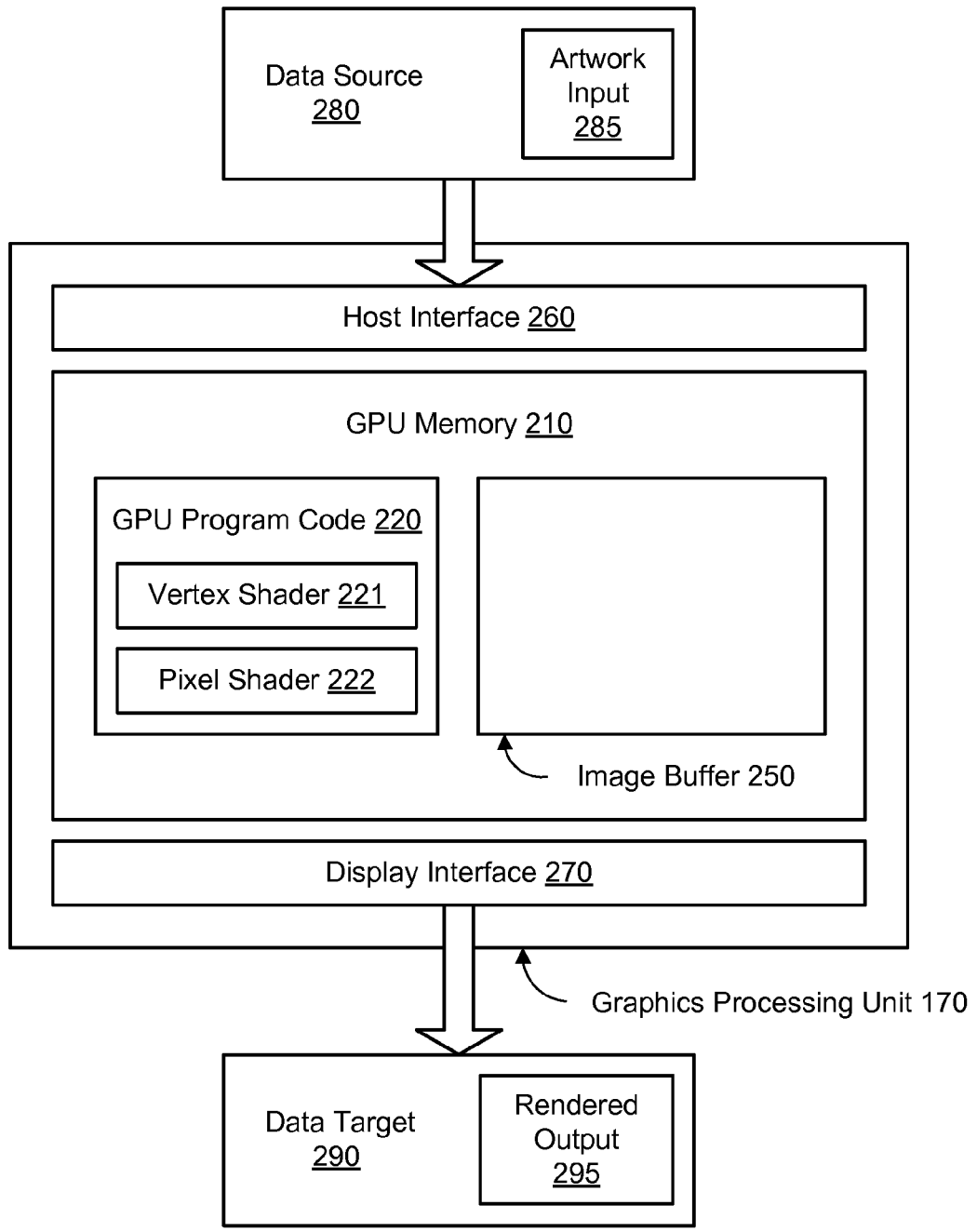
FIG. 2 is a block diagram illustrating an example of a graphics processing unit (GPU) configured to implement embodiments.

FIG. 2 is a block diagram illustrating an example of a graphics processing unit (GPU) configured to implement embodiments. The GPU 170, also referred to herein as a graphics processor, may comprise a dedicated graphics rendering device associated with a computer system. An example of a suitable computer system 100 for use with a GPU is illustrated in FIG. 1. Turning back to FIG. 2, the GPU 170 may include numerous specialized components configured to optimize the speed of rendering graphics output. For example, the GPU 170 may include specialized components for rendering three-dimensional models, for applying textures to surfaces, etc. For the sake of illustration, however, only a limited selection of components is shown in the example GPU 170. It is contemplated that GPU architectures other than the example architecture of FIG. 2 may be suitable for implementing the techniques described herein. The GPU 170 may implement one or more application programmer interfaces (APIs) that permit programmers to invoke the functionality of the GPU. Suitable GPUs may be commercially available from vendors such as NVIDIA Corporation, ATI Technologies, and others.

The GPU 170 may include a host interface 260 configured to communicate with a data source 280 (e.g., a communications bus and/or processor(s) 110 of a host computer system 100, or the host system itself). For example, the data source 280 may provide input data (e.g., artwork comprising one or more geometric objects) and/or executable program code to the GPU 170. In some embodiments, the host interface 260 may permit the movement of data in both directions between the GPU 170 and the data source 280. The GPU 170 may also include a display interface 270 for providing output data to a data target 190. For example, the data target 290 may comprise a display device 152, and the GPU 170 (along with other graphics components and/or interfaces 156) may "drive" the display 152 by providing graphics data at a particular rate from a screen buffer (e.g., the image buffer 250).

In one embodiment, the GPU 170 may include internal memory 210. The GPU memory 210, also referred to herein as "video memory" or "VRAM," may comprise random-access memory (RAM) which is accessible to other GPU components. As will be described in greater detail below, the GPU memory 210 may be used in some embodiments to store various types of data and instructions such as input data, output data, intermediate data, program instructions for performing various tasks, etc. In one embodiment, the GPU 170 may also be configured to access memory 120 of a host computer system 100 via the host interface 260. In one embodiment, program instructions 140 may be stored in the memory 120 of the host computer system 100 and executed by the host computer system 100 to generate rendered output 295 based on artwork input 285.

In one embodiment, the GPU 170 may include GPU program code 220 that is executable by the GPU 170 to perform aspects of the techniques discussed herein. Elements of the GPU program code 220 may be provided to the GPU 170 by a host computer system (e.g., the data source 280) and/or native to the GPU 170. In one embodiment, the GPU program code 220 may comprise a vertex shader 221. A vertex shader 221 comprises program instructions that are executable by the GPU 170 to determine properties (e.g., position) of a particular vertex. A vertex shader 221 may expect input such as uniform variables (e.g., constant values for each invocation of the vertex shader) and vertex attributes (e.g., per-vertex data). In one embodiment, the GPU program code 220 may comprise a pixel shader 222. A pixel shader 222 comprises program instructions that are executable by the GPU 170 to determine properties (e.g., color) of a particular pixel. A pixel shader 222 may also be referred to as a fragment shader. A pixel shader 222 may expect input such as uniform variables (e.g., constant values for each invocation of the pixel shader) and pixel attributes (e.g., per-pixel data). In generating the rendered output 295, both the vertex shader 221 and the pixel shader 222 may be executed at various points in the graphics pipeline.

The GPU memory 210 may comprise one or more buffers, and each buffer may comprise a two-dimensional array of pixel data (e.g., color values) and/or pixel metadata (e.g., depth values, stencil values, etc.). As illustrated in FIG. 2, for example, the GPU memory 210 may comprise an image buffer 250. The image buffer 250 may store intermediate or final pixel values generated in the rendering process. In one embodiment, the image buffer 250 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 250 may comprise a multi-sampling buffer usable for anti-aliasing.

Figure 3:
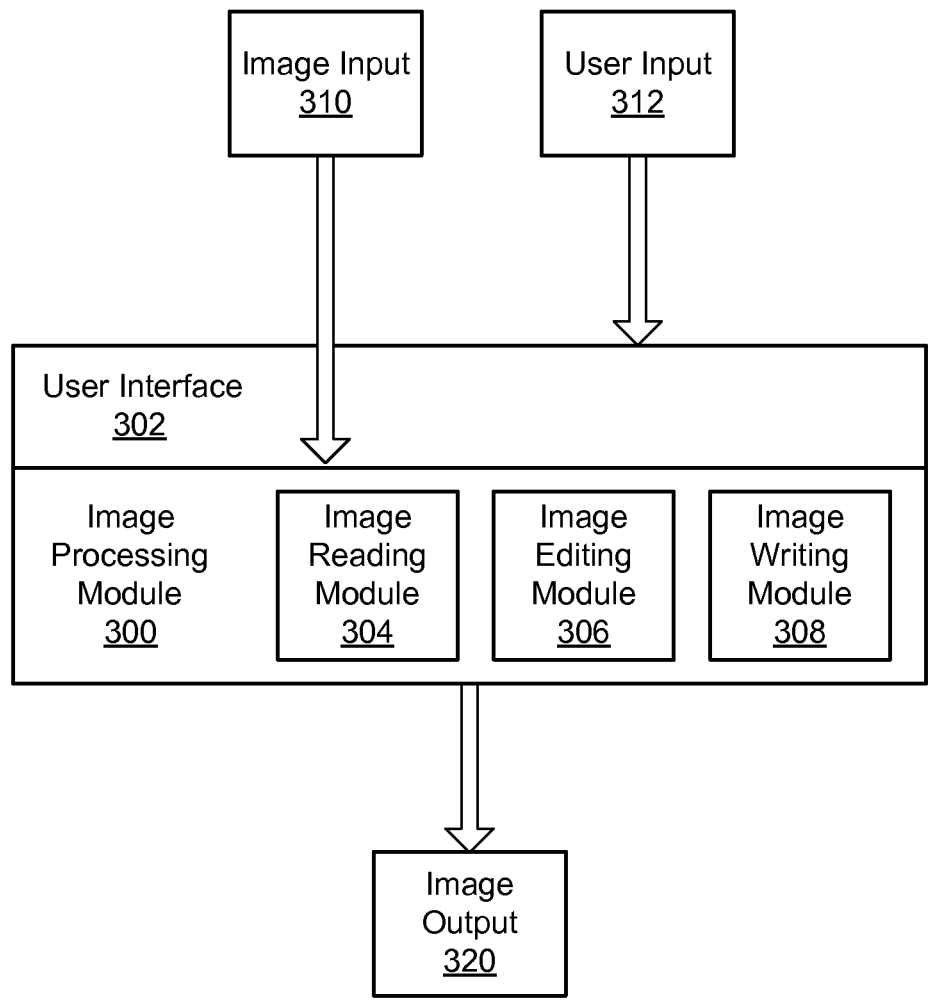
FIG. 3 illustrates an example image processing module that may implement embodiments of methods for writing pixels to tiled planar arrays and/or embodiments of methods for reading tiled planar data converted from a contiguous interleaved format by a GPU.

FIG. 3 illustrates an example image processing module that may implement embodiments of methods for writing pixels to tiled planar arrays and/or embodiments of methods for reading tiled planar data converted from a contiguous interleaved format by a GPU. In one embodiment, module 300 may provide a user interface 302 that includes one or more user interface elements via which a user may initiate, interact with, direct, and/or control the methods performed by module 300. Module 300 may obtain image input 310. The image input 310 may comprise digital image data to be displayed and edited using an image editing program. In various embodiments, the image input 310 may comprise two-dimensional (2D) graphical elements, three-dimensional (3D) graphical elements, or a combination thereof. In various embodiments, the image input 310 may comprise raster graphical elements, vector graphical elements, or a combination thereof. The image input 310 may be stored (e.g., in storage 160 and/or memory 120) as a plurality of tiled planar arrays. Tiled planar arrays are discussed in greater detail below.

In one embodiment, module 300 may also obtain user input 312. For example, the user input 312 may include one or more instructions to perform an image editing operation which requires write access to a tiled planar array. As another example, the user input 312 may include one or more instructions to perform an image editing operation which requires read or write access to image data in a tiled format. In various embodiments, such image editing operations may be initiated by user input, by automatic operation of the image processing module 300 itself (i.e., the operation may be initiated in response to the execution of program instructions and without direct user input), or by one or more instructions received by the image processing module 300 from another module. The user input 312 may be obtained using any suitable user input hardware 150.

An image reading module 304 may be used to read the image input 310 from storage (e.g., from secondary storage such as storage 160). An image editing module 306 may be used to perform the one or more image editing operations on the image input 310. An image writing module 308 may be used to write the edited image (e.g., to secondary storage such as storage 160). In one embodiment, the process performed by the image reading module 304 may be performed automatically and/or programmatically. In one embodiment, the process performed by the image editing module 306 may be performed automatically and/or programmatically. In one embodiment, the process performed by the image writing module 308 may be performed automatically and/or programmatically. The module 300 may produce an edited image 320 as output.

Image processing module 300 may be implemented as or in a stand-alone application or as a module of or plug-in for an image processing, image editing, and/or image presentation application. Examples of types of applications in which embodiments of module 300 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® Photoshop® and Adobe® Illustrator®. In addition to generating output image 320, module 300 may be used to display, manipulate, modify, and/or store the output images, for example to a memory medium such as a storage device or storage medium.

In one embodiment, the image writing module 308 may write pixels to tiled planar arrays. As used herein, the term "tiled" means that the image is stored as a plurality of separate, fixed-size sub-rectangles of pixels rather than a single large rectangle of pixels. For example, an image of 300 by 400 pixels might be stored in twelve tiles of 100 by 100 pixels each. Typically, an individual tile represents a piece of a larger image upon which an image editing program operates (e.g., displays and/or edits) at a point in time. In one embodiment, the image editing program may not subdivide the tiles. In one embodiment, only the tiles representing the portion of the image currently being processed need be present in main memory, and other tiles may be stored on secondary (e.g., disk) storage. Tiles for which all pixels have the same value may be stored in a compact special representation which includes one instance of the single, shared value. Multiple images which contain identical pixel values in a particular area may share tiles. In one embodiment, if one of the images which share tiles is to be modified, a separate copy may first be made of each tile in the area to be modified so that the other images are not also modified.

Because of the above characteristics, the image editing program may perform an operation referred to as "lock for write" before accessing the pixels of an image (e.g., using the image reading module 304). In conjunction with the writing of data to a portion of memory by one entity, a lock for write operation may disallow access to the portion of memory by other entities. Accordingly, the use of a lock for write operation may prevent problems potentially resulting from concurrent access of multiple entities to the portion of memory. However, the lock for write operation is potentially expensive and may involve multiple steps. For example, for each area of pixels to be accessed, the program must ensure that the tiles containing those pixels are copied from secondary storage to main memory (if necessary), that the tiles stay in main memory for the duration of the operation, that single-value tiles are changed from their compact representation to the normal representation, and that a copy is made if the tile is shared and it is to be modified. The result of the lock for write operation on a tile is the location within main memory where data can be written into that tile. When the process of writing data to the pixels of a tile is complete, the tile may be "unlocked." The unlocking operation may be relatively inexpensive compared to the lock for write operation.

FIG. 4A illustrates an example of planar tiled storage of RGBA data, according to one embodiment. Each different component of an RGBA image (i.e., red, green, blue, and alpha components or channels) may be stored separately, and each different component may be stored as a plurality of tiles. As used herein, the term "planar" means that the pixels of the image are stored such that each tile contains only a single color or alpha component rather than containing all the color or alpha components for each pixel stored adjacent to each other. In other words, one tile may store the red component of an RGBA image, another tile may store the green component, another tile may store the blue component, and yet another tile may store the alpha component. As shown in the example of FIG. 4A, the red component of a pixel is indicated as an "R," the green component of a pixel is indicated as a "G," the blue component of a pixel is indicated as a "B," and the alpha component of a pixel is indicated as an "A." Using a planar approach to storage, an RGBA image of 4 by 4 pixels may be stored as the planar tiles 400 shown in FIG. 4A. A first tile of the four planar tiles 400 includes sixteen individual red components from the sixteen pixels of the image. Similarly, a second tile of the four planar tiles 400 includes sixteen green components, a third tile of the four planar tiles 400 includes sixteen blue components, and a fourth tile of the four planar tiles 400 includes sixteen alpha components.

FIG. 4B illustrates an example of interleaved tiled storage of RGBA data, according to one embodiment. A set of interleaved tiles 410 may include four tiles representing sixteen pixels of RGBA image data. Each of the four interleaved tiles 410 includes four RGBA pixels with interleaved red, green, blue, and alpha values. The interleaved tiles 410 are configured in a non-planar, interleaved format such that red data is stored alongside green data, green data is stored alongside blue data, blue data is stored alongside alpha data, and so on.

In a planar representation (e.g., as shown in FIG. 4A), at least four separate tiles should be locked for write for each area within the image to be modified because the RGBA data is distributed among the separate tiles. In a non-planar representation (e.g., as shown in FIG. 4B), only one tile should be locked for write for each pixel to be modified. Therefore, the use of the planar approach may present additional computational expense when an image editing program accesses the pixels of an image. Accordingly, systems and methods are described as follows for efficient writing of pixels to tiled planar pixel arrays.

In a typical approach for processing a buffer of pixels and copying the result into a set of planar tiles, an image editing program may perform the following operations in sequence. For each area (corresponding to a tile) within the image containing pixels to be modified, the program may lock for write the red tile, lock for write the green tile, lock for write the blue tile, and lock for write the alpha tile. The program may then perform the desired image processing operation. The program may copy the results of the image processing operation into one or more of the locked tiles. Finally, the program may unlock the red, green, blue, and alpha tiles. In the typical approach, all of these operations may be performed in sequence.

As described herein, systems and methods for writing pixels to tiled planar arrays may provide one or more performance-enhancing modifications to the typical approach described above. The various performance-enhancing modifications may be used separately or together. In one embodiment, lock for write operations are performed in parallel with the image processing operation. In one embodiment, the results of an image processing operation are copied to multiple tiles in parallel. In one embodiment, if all of the pixels within a tile are to be modified, the conversion from the compact special representation may be avoided, and tiles may shared with other images may not be copied first.

Most modern computer processors have multiple processor cores, each of which can perform an independent sequence of operations. In order to utilize most of the processing capacity of multiple processors and/or multiple cores, multiple sequences of operations may be performed in parallel. In some configurations, parallelism may be applied to the copying of data as well as to computation. Accordingly, the systems and methods described herein may use multiple separate threads of execution, i.e., sequences of operations that may be performed concurrently by separate processors or processor cores. The multiple threads may use any suitable method for sending and receiving values between them. In one embodiment, the threads may be designated as a first thread, a second thread, and one or more other threads. The number of other threads may be determined using any suitable basis, such as by measuring performance or by using a library that chooses the number of threads. All of the threads may operate simultaneously, and a thread may wait only when it cannot take further action without receiving information from another thread.

Figure 5:
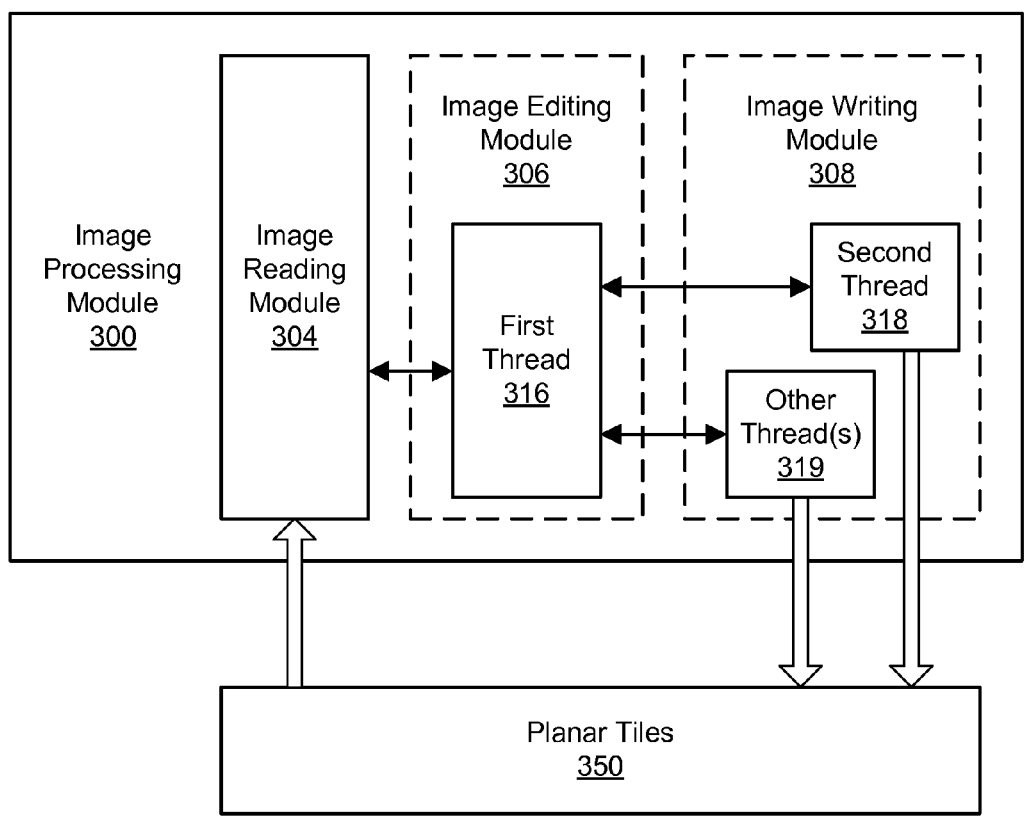
FIG. 5 illustrates further aspects of an example image processing module that may implement embodiments of methods for writing pixels to tiled planar arrays.

FIG. 5 illustrates further aspects of an example image processing module that may implement embodiments of methods for writing pixels to tiled planar arrays. In one embodiment, the first thread 316 performs the image processing operation and coordinates the actions of the second thread 318 and the other thread(s) 319. In one embodiment, the second thread 318 performs the lock for write operations on the planar tiles 350. In one embodiment, the one or more other threads 319 perform the copying of data into planar tiles 350.

Figure 6:
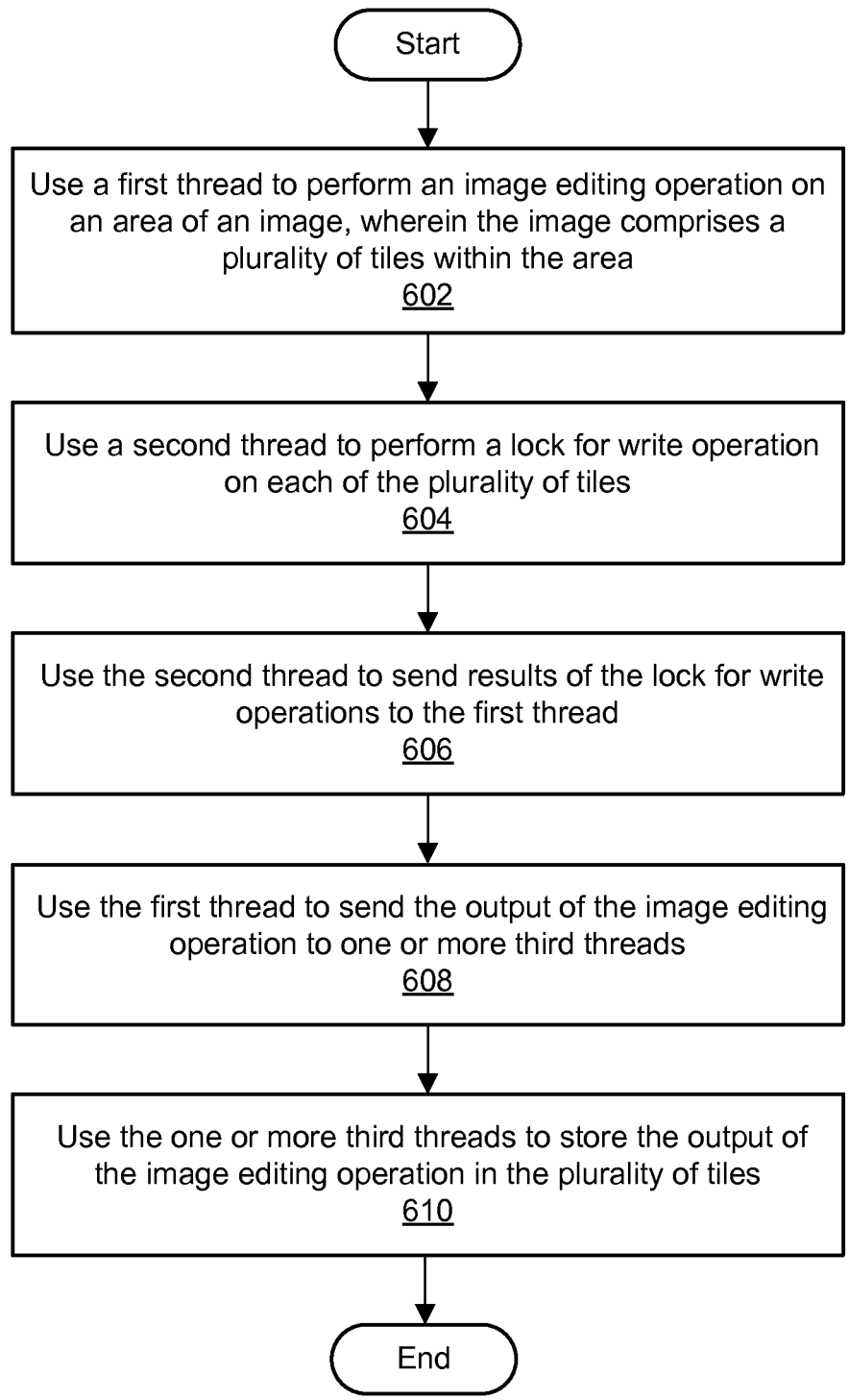
FIG. 6 is a flowchart illustrating a method for writing pixels to tiled planar arrays, according to one embodiment.

FIG. 6 is a flowchart illustrating a method for writing pixels to tiled planar arrays. The method shown in FIG. 6 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 602, a first thread 316 may be used to perform an image editing operation on an area of an image, wherein the image comprises a plurality of tiles within the area. The first thread 316 may coordinate or supervise the image editing operation, including any necessary lock for write operations. In one embodiment, the first thread 316 may perform the following operations. The first thread 316 may send to the second thread 318 a description of the image pixels to be modified. The first thread 316 may perform the image processing operation, possibly by coordinating the actions of unrelated threads. For example, the unrelated threads may apply various graphics processing or editing operations to image data. For each tile within the image containing pixels to be modified, the first thread 316 may receive from the second thread 318 the result of a lock for write operation. For each tile within the image containing pixels to be modified, the first thread 316 may also send to one of the other threads 319 the result of the lock for write operation and a pointer to the image processing results that should be copied to that tile.

As shown in 604, a second thread 318 may be used to perform a lock for write operation on one or more of the plurality of tiles. As shown in 606, the second thread 318 may be used to send results of the lock for write operations to the first thread 316. In one embodiment, the second thread 318 may perform the following operations. The second thread 318 may receive from the first thread 316 a description of the image pixels to be modified. In one embodiment, based on this description, the second thread 318 may determine which tiles are to be locked for write. For each area corresponding to a tile within an RGBA image containing pixels to be modified, the second thread 318 may perform a lock for write operation on the red tile, green tile, blue tile, and alpha tile. The second thread 318 may send to the first thread 316 the results of the lock for write operations. The result of each lock for write operation may include a memory location at which data can be written. In a further embodiment, a plurality of second threads may perform these operations rather than one second thread.

As shown in 608, the first thread may be used to send the output of the image editing operation to one or more third threads 319. The one or more third threads 319 may receive the output of the image editing operation sent from the first thread 316. As shown in 610, the one or more third threads 319 may be used to store the output of the image editing operation in the plurality of tiles 350. Any suitable number of other threads 319 may be used. In one embodiment, for example, each tile to be modified may be associated with a corresponding one of the other threads 319. In one embodiment, each of the other threads 319 may perform the following operations. The other thread 319 may receive from the first thread 316 the result of a lock for write operation and a pointer to the image processing results that should be copied to that tile. The other thread 319 may copy the data from the image processing result to the tile. The other thread 319 may then unlock the tile. The unlocking operation may result in reclaiming the memory used by the tile and copying the tile back to secondary storage (e.g., disk). The unlocking operation may also make the unlocked tile available for writing by another image editing operation. In one embodiment, a virtual memory system may track whether the tiles 350 are in primary storage or secondary storage.

In one embodiment, if all of the pixels within a tile are to be modified, additional performance enhancements may be achieved. For example, if the entirety of a tile is to be overwritten completely, then the original contents of the tile may be ignored. In this manner, the conversion from the compact special representation may be avoided to enhance performance. Similarly, the process of making a copy of a shared tile may be avoided since the original contents of the shared tile are irrelevant to the outcome of the image editing operation. A new tile may be generated in memory instead. After the image editing operation is performed on the newly generated tile, the tile may no longer be shared as it was before the operation.

When image editing operations are sought to be performed in real-time (e.g., such that the displayed image can be updated quickly), efficient use of computing resources and memory bandwidth is key. CPUs (e.g., processor(s) 110) may be used to coordinate the use of computing and input/output (I/O) resources, including GPU resources. To maintain maximum memory bandwidth on modern CPUs, memory may be threaded across multiple cores of the CPU(s) 110. In one embodiment, efficient use of the GPU 170 may include providing the GPU with image data in an RGBA interleaved format in sufficiently large tiles (e.g., 2 k by 2 k pixels). However, an image editing program may require image data to be stored in a tiled planar format. Accordingly, the RGBA interleaved data used by a GPU may be converted (e.g., for use by an image editing program) using the systems and methods described herein.

Discrete GPUs typically offer a much larger memory bandwidth than that of modern CPUs, and fusion processors (integrating both CPU and GPU functionality) also tend to dedicate more memory bandwidth to the GPU than to the CPU. Accordingly, the GPU may be leveraged to format the data on the GPU in a format that is efficient for the CPU. The considerations for the format may include cache coherency, ease of treading, and avoidance of gathered reads and scattered writes. Image editing programs may benefit in terms of storage costs and computing costs from storing pixel data in a tiled planar format. Tiles may represent the smallest amount of pixel data that can be atomically accessed from storage by an image editing program. When the image is stored in RGBA channels, one or more of the channels in a tile may be constant (e.g., the alpha channel or user mask). In such an instance, the image editing program may avoid writing the entire tile to disk by noting that the tile representing the constant channel can be represented by a single constant value. Typically, the tile size may represent the smallest level of interruption to service a user's request (i.e., moving a slider). Therefore, a deep document with many layers potentially has to composite a large amount of data to offer up a single update for the area represented by a tile. This often forces small tile sizes in practice which both underutilize the CPU and GPU. Meeting the maximum bandwidth potential during memory moves with CPUs may demand the source and destination to be cache-line friendly, and thus the format returned by the GPU may place the data for one tile in a contiguous stream, possibly aligned to a cache line. Even when reading back single channel data from the GPU to the CPU, it may be efficient to format the data into an RGBA texture because device drivers are typically optimized for RGBA textures. The reformatting into RGBA data may also allow for the maximal amount of data to be contained in one texture, given that all textures may be constrained to the same size (e.g., grayscale data may be limited to the same maximum size constraints of RGBA, and thus the RGBA texture can contain more information).

Figure 7A:
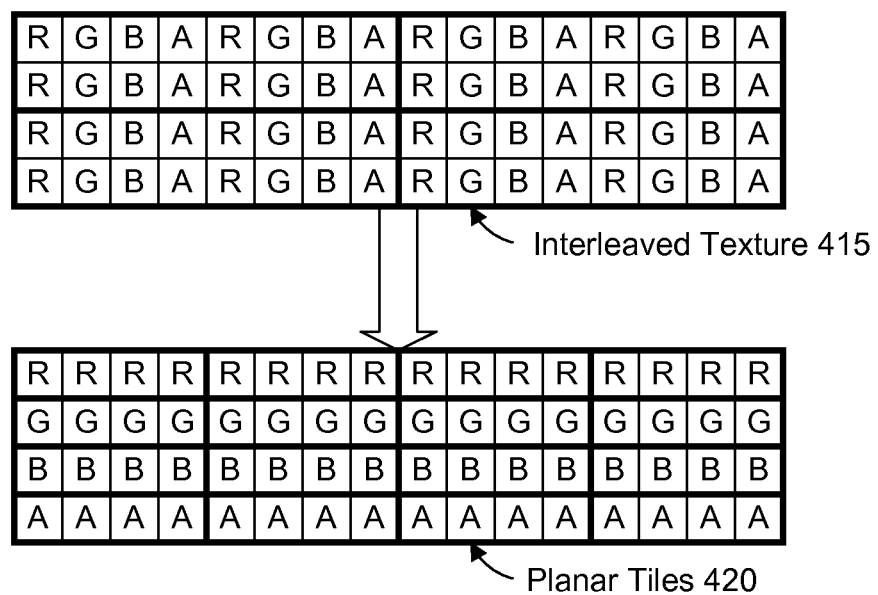
FIGS. 7A-7E illustrate examples of a conversion of RGBA interleaved image data to a tiled planar format, according to one embodiment.

FIG. 7A illustrates an example of a conversion of RGBA interleaved image data to a tiled planar format, according to one embodiment. Although tiles having a particular size and particular dimensions are shown for purposes of illustration, it is contemplated that the systems and methods described herein may be applied to any suitable number of pixels and any suitable tile dimensions or tile sizes. Using the systems and methods described herein, the image data in the interleaved texture 415 may be converted to an planar tiled format 420. The planar tiles 420 may represent a stream of image data. In one embodiment, the conversion of the interleaved texture 415 to the planar tiles 420 may be performed by a GPU (e.g., by the execution of suitable program instructions on the GPU, such as a shader program) based on image data stored on the GPU. In the planar tiles 420, the first four R values may be written to a first tile of 2 pixels by 2 pixels. In this manner, four tiles may be generated for the R values in the source image data 415. Similarly, four tiles may be generated for the G values, four tiles for the B values, and four tiles for the A values. Accordingly, based on the four tiles in the original image data 415 on the GPU, sixteen tiles 420 may be generated for use by a program on the CPU.

Figure 7B:
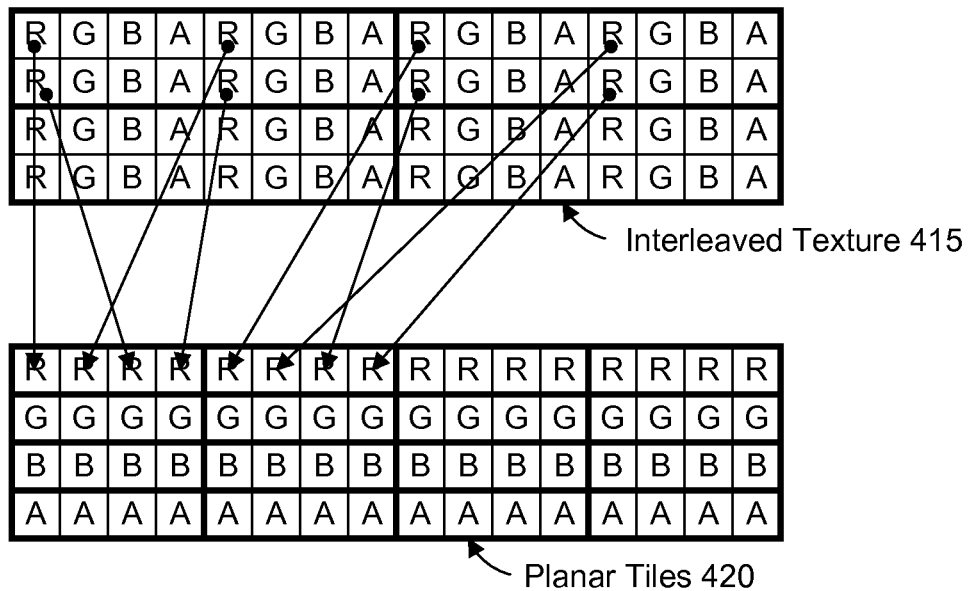
Figure 7C:
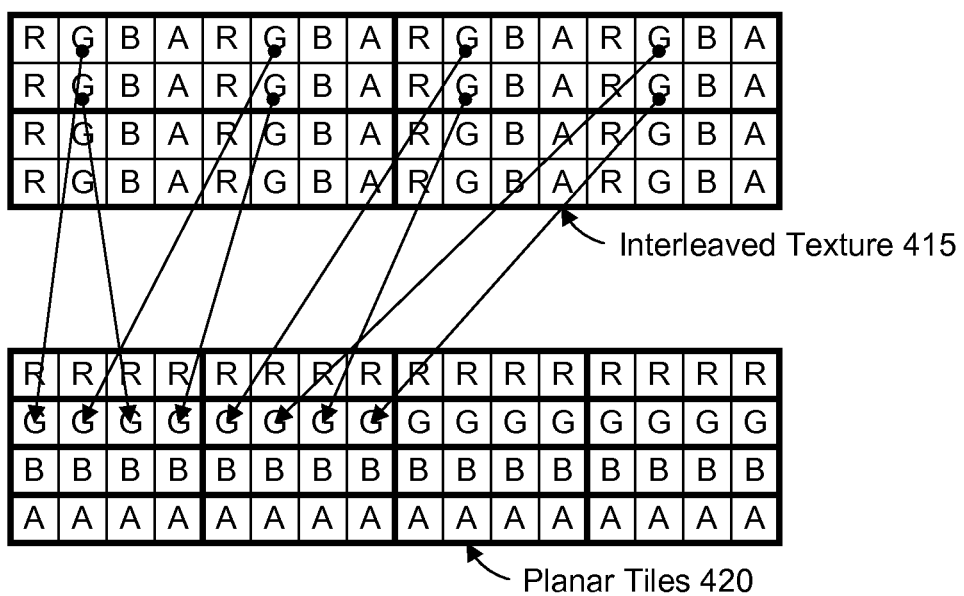
Figure 7D:
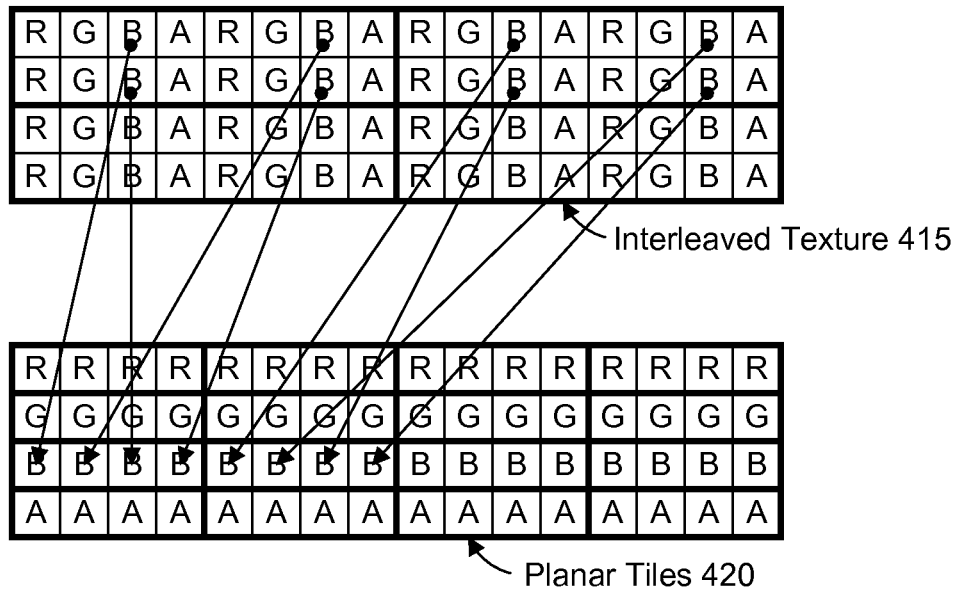
Figure 7E:
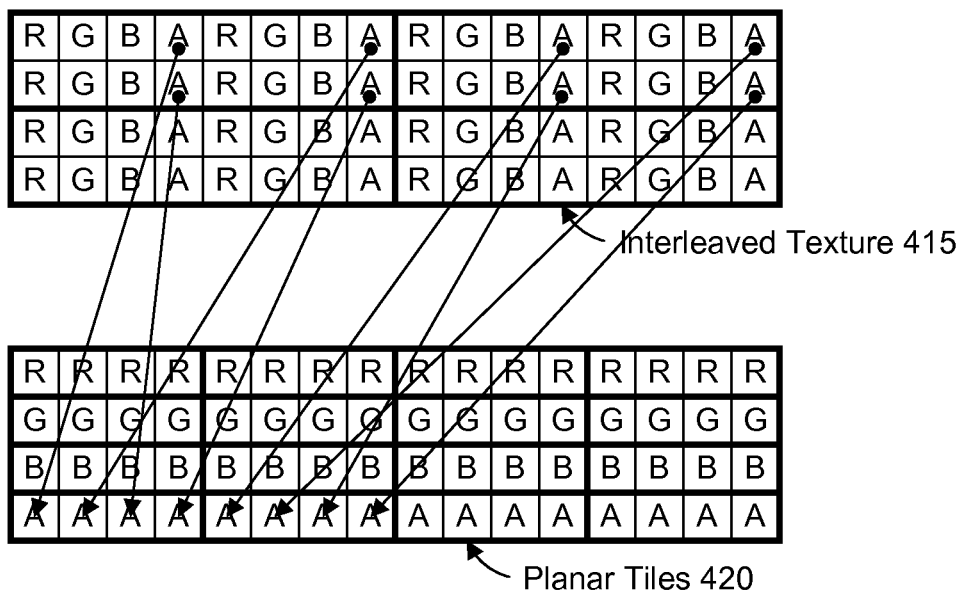

FIGS. 7B, 7C, 7D, and 7E further illustrate the conversion of RGBA interleaved image data to a tiled planar format, according to one embodiment. Each of FIGS. 7B, 7C, 7D, and 7E shows an example of a mapping between the interleaved texture 415 and the planar tiles 420 for a particular component. FIG. 7B illustrates an example of the mapping of red (R) values from the interleaved texture 415 to the planar tiles 420. FIG. 7C illustrates an example of the mapping of green (G) values from interleaved texture 415 to the planar tiles 420. FIG. 7D illustrates an example of the mapping of blue (B) values from interleaved texture 415 to the planar tiles 420. FIG. 7E illustrates an example of the mapping of alpha (A) values from the interleaved texture 415 to the planar tiles 420.

Figure 8:
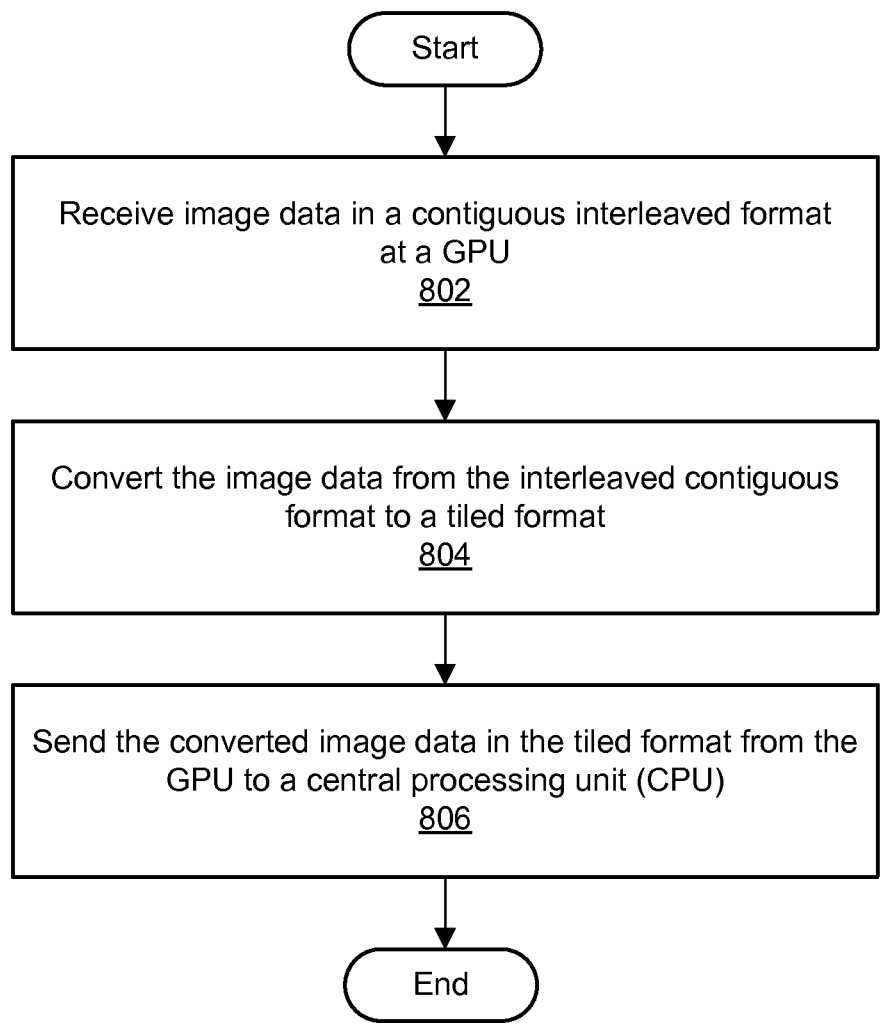
FIG. 8 is a flowchart illustrating a method for converting image data from a contiguous interleaved format using a GPU, according to one embodiment.

FIG. 8 is a flowchart illustrating a method for converting image data from a contiguous interleaved format using a GPU. The method shown in FIG. 8 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 802, image data in a contiguous interleaved format may be received at a graphics processing unit (GPU). The image data in the contiguous interleaved format may be stored as a texture in a memory managed by the GPU. As shown in 804, the image data may be converted to a tiled format from the contiguous interleaved format. In one embodiment, the tiled format comprises a tiled planar format. In one embodiment, the tiled format comprises a tiled interleaved format. The tiled format may be readable by an image editing program running on a central processing unit (CPU). To convert the image data, the GPU may execute a shader program such as a pixel shader. The output of the shader may comprise a plurality of tiles representing a rearrangement of the RGBA image data from the original image data in the contiguous interleaved format. RGBA data may be mapped from particular locations in the original image data in the contiguous interleaved format to particular locations in the converted image data in the tiled format.

As shown in 806, the converted image data in the tiled format may be sent from the GPU to the CPU. Any suitable techniques may be used for sending the image data in the tiled format from the GPU to the CPU. In one embodiment, a readback operation may be used to transfer the converted image data from the GPU to the CPU. The converted image data may be stored in a memory managed by the CPU. An image editing program on the CPU may read the converted image data in the tiled format.

For a tiled planar image format, the image data may be de-interleaved upon readback from the GPU to an interleaved contiguous buffer in memory managed by the CPU. The de-interleaving process may include, for each destination tile geometry intersected with a given rectangle, performing a lock for write operation on each of the red, green, blue, and alpha tiles. The de-interleaving process may then de-interleave the image data from the returned buffer into the planar tiles. Non-cache-coherent memory fetches and scattered writes may take place at this stage. FIG. 9 illustrates an example of program code for de-interleaving image data from the returned buffer into the planar tiles, according to one embodiment.

For a tiled interleaved image format, memory move operations may be performed upon readback from the GPU to an interleaved contiguous buffer in memory managed by the CPU. For each destination tile geometry intersected with a given rectangle, a lock for write operation may be performed on the destination tile, and a memory move operation may be performed from the returned buffer into the tile. Non-cache-coherent memory fetches may take place at this stage.

In one embodiment, a pixel shader 222 on the GPU 170 may be used to convert pixel data from an RGBA interleaved contiguous texture to a format appropriate for a CPU-based tiling system. The pixel shader 222 may be given descriptions of the destination tiled image in order to reorder the data into an efficient format for use on the CPU. The description data may include the starting origin in the destination tile, the destination tile size, and the width and height of the source image. In one embodiment, one pixel shader program may be used to handle conversion to a planar tiled format, and another pixel shader program may be used to handle conversion to an interleaved tile format. The planar conversion process may write into an RGBA texture in order to maximize the volume of data that can be processed in parallel.

In one embodiment, the GPU 170 may be used to convert pixel data from an RGBA interleaved contiguous texture to a tiled planar format. The conversion may be performed before readback from the GPU to an interleaved contiguous buffer (e.g., in a buffer managed by the CPU). A contiguous interleaved to planar tiled pixel shader may be engaged to perform the conversion. The pixel shader may be implemented using any suitable techniques or languages. In one embodiment, for example, the pixel shader may be implemented using OpenGL Shading Language (GLSL). The pixel shader may render a quad which converts the data in interleaved RGBA format to a planar tiled set of streams encoded in an RGBA texture. A readback operation may then be performed on the texture to transfer the image data from the GPU to memory managed by the CPU. For each destination tile geometry intersected with a given rectangle, a lock for write operation may then be performed on each of the red, green, blue, and alpha tiles. A memmove or blockmove operation may be performed to transfer the image data from the returned buffer into the planar tiles, typically using one thread per tile.

FIGS. 10A through 10E illustrate example program code for converting contiguous interleaved image data to a tiled planar format, according to one embodiment. The program code illustrated in FIGS. 10A through 10E may be implemented as a pixel shader. In one embodiment, the program code may generate a tiled planar pixel stream of the form AAAARRRRGGGGBBBB based on image data of the form RGBA (i.e., a chunky pixel format). The shader may assume that the texture rectangle has sub-tiles and that the number of output pixels is four times the number of input pixels (i.e., width by height). The destination image may be broken into four strips. In one embodiment, the topmost strip may be filled with alpha data, the next strip with red data, then green data, and finally blue data. Each of the four strips may be the same size as the original image data. In one embodiment, the destination texture may comprise a single component alpha texture.

In one embodiment, the GPU 170 may be used to convert pixel data from an RGBA interleaved contiguous texture to a tiled interleaved format. The conversion may be performed before readback from the GPU to an interleaved contiguous buffer (e.g., in memory managed by the CPU). A contiguous interleaved to tiled stream interleaved pixel shader may be engaged to perform the conversion. The pixel shader may be implemented using any suitable techniques or languages. In one embodiment, for example, the pixel shader may be implemented using OpenGL Shading Language (GLSL). The pixel shader may render a quad which prompts the GPU to converts the data in interleaved RGBA format to an interleaved tiled set of streams encoded in an RGBA texture. A readback operation may then be performed on the texture to transfer the image data from the GPU to a buffer managed by the CPU. For each destination tile geometry intersected with a given rectangle, a lock for write operation may then be performed on the destination tile. A memmove or blockmove operation may be performed to transfer the image data from the returned buffer into the tiles, typically using one thread per tile.

FIGS. 11A through 11C illustrate example program code for converting contiguous interleaved image data to a tiled interleaved format, according to one embodiment. The program code illustrated in FIGS. 11A through 11C may be implemented as a pixel shader. In one embodiment, the program code may generate a tiled interleaved pixel stream of the form RGBA based on image data of the form RGBA (i.e., a chunky pixel format). The shader may assume that the texture rectangle has sub-tiles and that the number of output pixels is the same as the number of input pixels (i.e., width by height).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   receiving image data in a contiguous interleaved format at a graphics processing unit (GPU);
   generating converted image data in a tiled format based on the image data in the contiguous interleaved format; and
   sending the converted image data in the tiled format from the GPU to a central processing unit (CPU).

2. The method as recited in claim 1, wherein the tiled format comprises a tiled planar format.

3. The method as recited in claim 1, wherein the tiled format comprises a tiled interleaved format.

4. The method as recited in claim 1, wherein sending the converted image data in the tiled format from the GPU to the CPU comprises performing a readback operation.

5. The method as recited in claim 1, wherein generating converted image data in the tiled format based on the image data in the contiguous interleaved format comprises executing a shader program on the GPU, wherein the converted image data in the tiled format is an output of the shader program.

6. The method as recited in claim 1, further comprising:
   storing the converted image data in a memory managed by the CPU.

7. The method as recited in claim 6, further comprising:
   an image editing program reading the converted image data from the memory.

8. A system, comprising:
   at least one central processing unit (CPU);
   a first memory coupled to the at least one CPU;
   at least one graphics processing unit (GPU) coupled to the at least one CPU; and
   a second memory coupled to the at least one GPU, wherein the second memory stores program instructions, wherein the program instructions are executable by the at least one GPU to:
     convert image data from a contiguous interleaved format to a tiled format; and
     send the converted image data in the tiled format to the at least one CPU, wherein the converted image data is stored in the first memory.

9. The system as recited in claim 8, wherein the tiled format comprises a tiled planar format.

10. The system as recited in claim 8, wherein the tiled format comprises a tiled interleaved format.

11. The system as recited in claim 8, wherein, in sending the converted image data in the tiled format to the at least one CPU, the program instructions are further executable by the at least one GPU to perform a readback operation.

12. The system as recited in claim 8, wherein the program instructions comprise a shader program, wherein the shader program is executable by the at least one GPU to convert the image data from the contiguous interleaved format to the tiled format, wherein the converted image data in the tiled format is an output of the shader program.

13. The system as recited in claim 8, wherein the first memory stores an image editing program, wherein the image editing program is executable by the at least one CPU to:

read the converted image data from the first memory.

14. A non-transitory computer-readable storage medium storing program instructions that, responsive to execution by a computer, causes the computer to perform operations comprising:

receiving image data in a contiguous interleaved format at a graphics processing unit (GPU);

generating converted image data in a tiled format based on the image data in the contiguous interleaved format; and sending the converted image data in the tiled format from the GPU to a central processing unit (CPU).

15. The computer-readable storage medium as recited in claim 14, wherein the tiled format comprises a tiled planar format.

16. The computer-readable storage medium as recited in claim 14, wherein the tiled format comprises a tiled interleaved format.

17. The computer-readable storage medium as recited in claim 14, wherein sending the converted image data in the tiled format from the GPU to the CPU comprises performing a readback operation.

18. The computer-readable storage medium as recited in claim 14, wherein generating converted image data in the tiled format based on the image data in the contiguous interleaved format comprises executing a shader program on the GPU, wherein the converted image data in the tiled format is an output of the shader program.

19. The computer-readable storage medium as recited in claim 14, further comprising:

receiving a description of the converted image data in the tiled format at the GPU.

20. The computer-readable storage medium as recited in claim 19, wherein the description comprises a starting origin in a destination tile, a destination tile size, and spatial dimensions of a source image.

* * * * *